United States Patent [19]

Austen

[11] 4,288,064

[45] Sep. 8, 1981

[54] TIMED-ACTION ACTUATORS

[76] Inventor: Alfred R. Austen, R.D. #1, Box 451, Center Valley, Pa. 18034

[21] Appl. No.: 146,745

[22] Filed: May 5, 1980

[51] Int. Cl.³ .............................................. F16F 1/26
[52] U.S. Cl. .................................... 267/182; 267/159
[58] Field of Search ............................... 267/159, 182

[56] References Cited

U.S. PATENT DOCUMENTS

| 1,883,249 | 10/1932 | Spencer | 267/159 X |
| 1,962,927 | 6/1934 | De Bats | 46/37 |
| 1,988,345 | 1/1935 | Vaughn | 74/100 P |
| 2,368,193 | 1/1945 | Boynton | 267/159 |
| 2,545,264 | 3/1951 | Davis | 267/159 X |
| 2,571,170 | 10/1951 | Stilwell, Jr. | 267/159 X |
| 2,604,316 | 7/1952 | O'Brien et al. | 267/159 |
| 3,582,594 | 6/1971 | Twyford | 267/159 X |
| 3,789,742 | 2/1974 | Hershman et al. | 267/159 X |

Primary Examiner—William A. Cuchlinski, Jr.
Attorney, Agent, or Firm—James C. Simmons

[57] ABSTRACT

A resettable apparatus including a deformable restraining element adapted to contact and restrain active elements for producing a time-delayed force or displacement response. The apparatus functions by the release of the force and/or displacement active element by the creep deformation action of the restraining element at a time interval after actuation of the active element.

15 Claims, 41 Drawing Figures

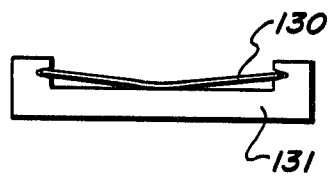
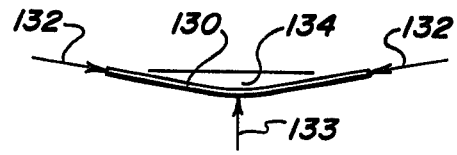
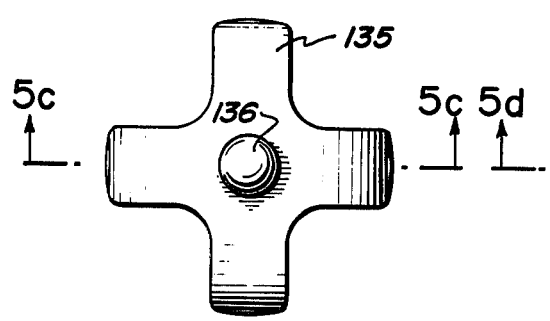
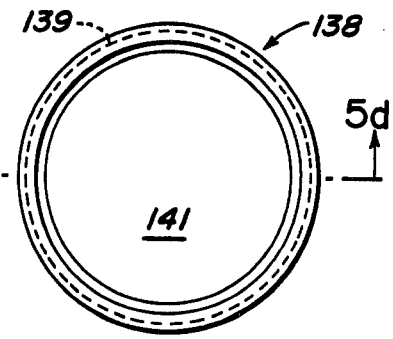
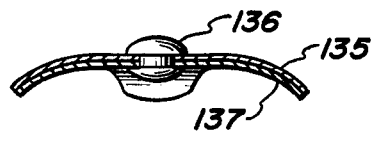
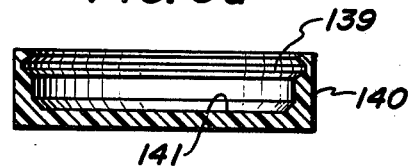
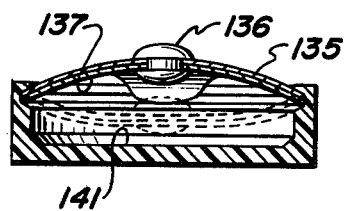
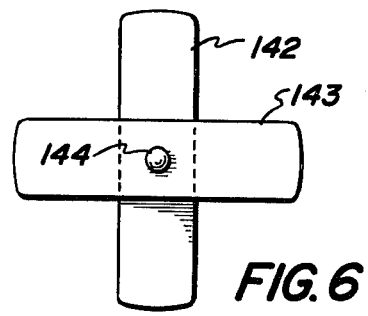

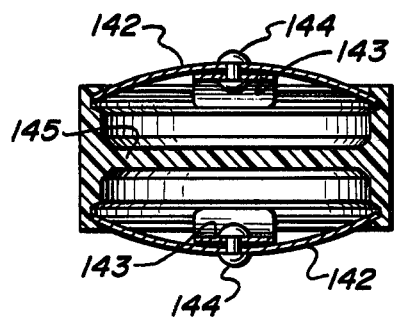
FIG. 7
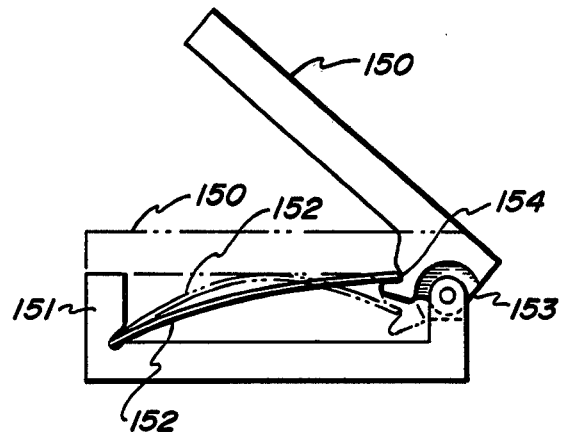
FIG. 8a
FIG. 8b
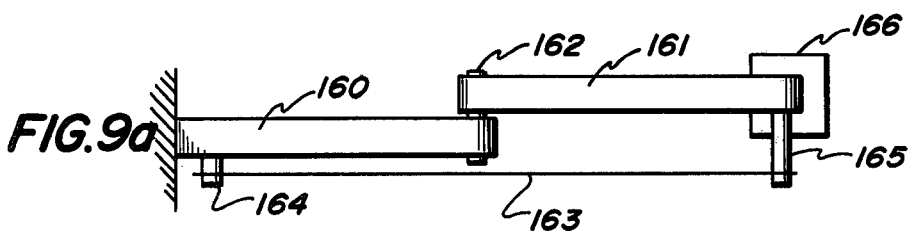
FIG. 9a
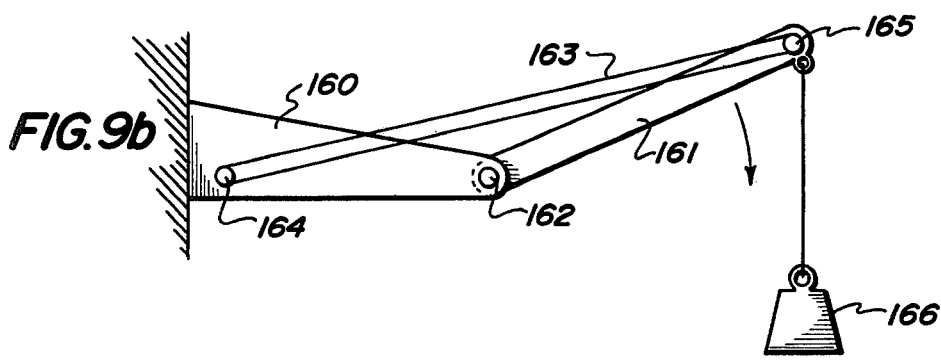
FIG. 9b

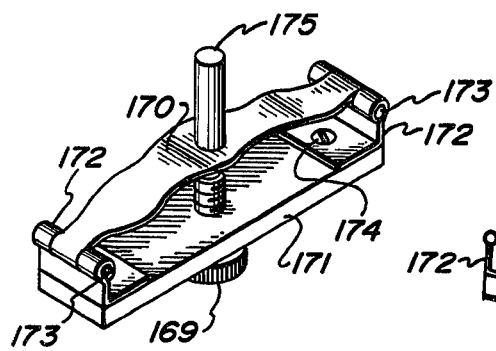
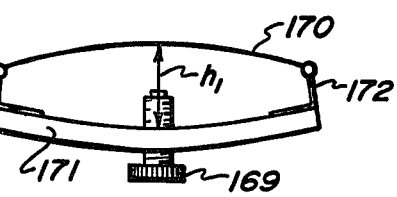
FIG. 10a  FIG. 10b
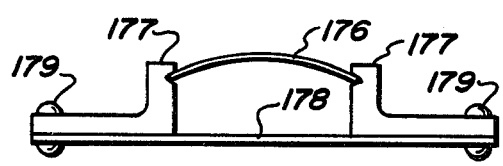
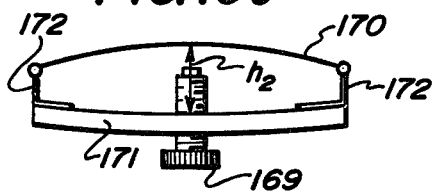
FIG. 11a  FIG. 10c
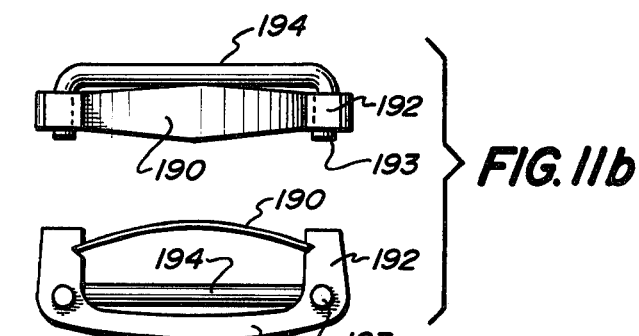
FIG. 11b
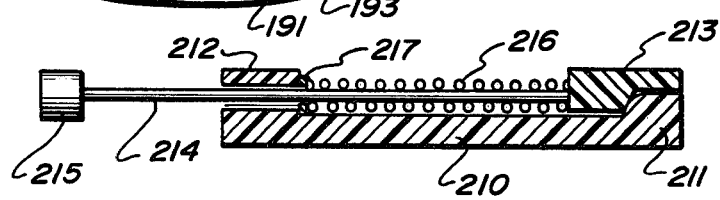
FIG. 12a
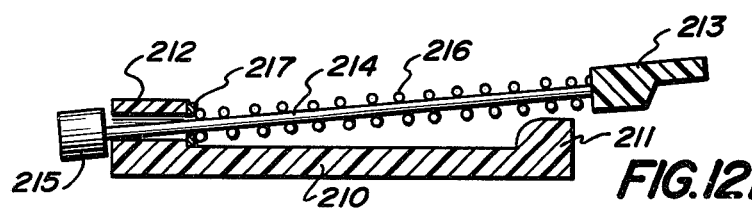
FIG. 12b

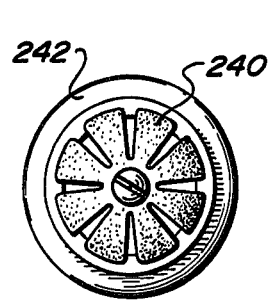
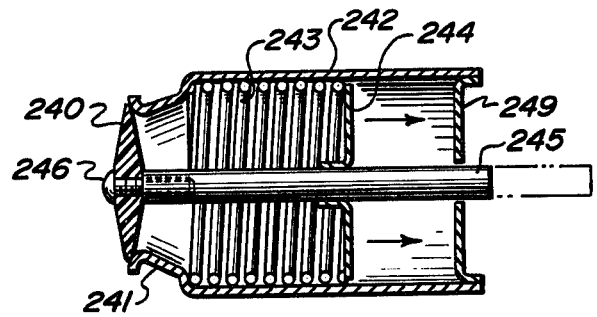
FIG. 13a　　　　　FIG. 13b
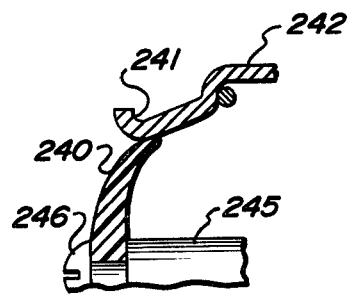
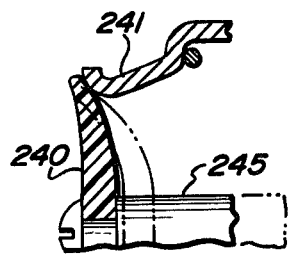
FIG. 13c　　　FIG. 13d　　　FIG. 13e
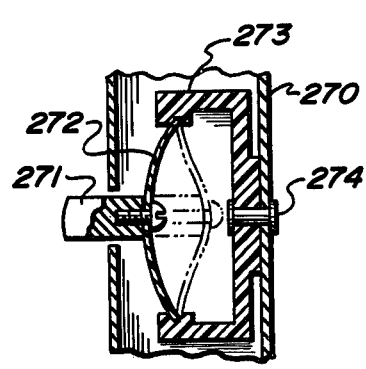
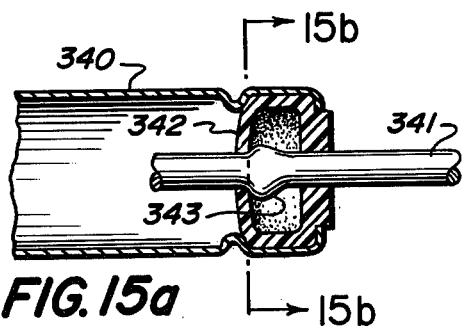
FIG. 14　　　FIG. 15a
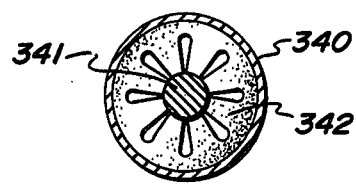
FIG. 15b

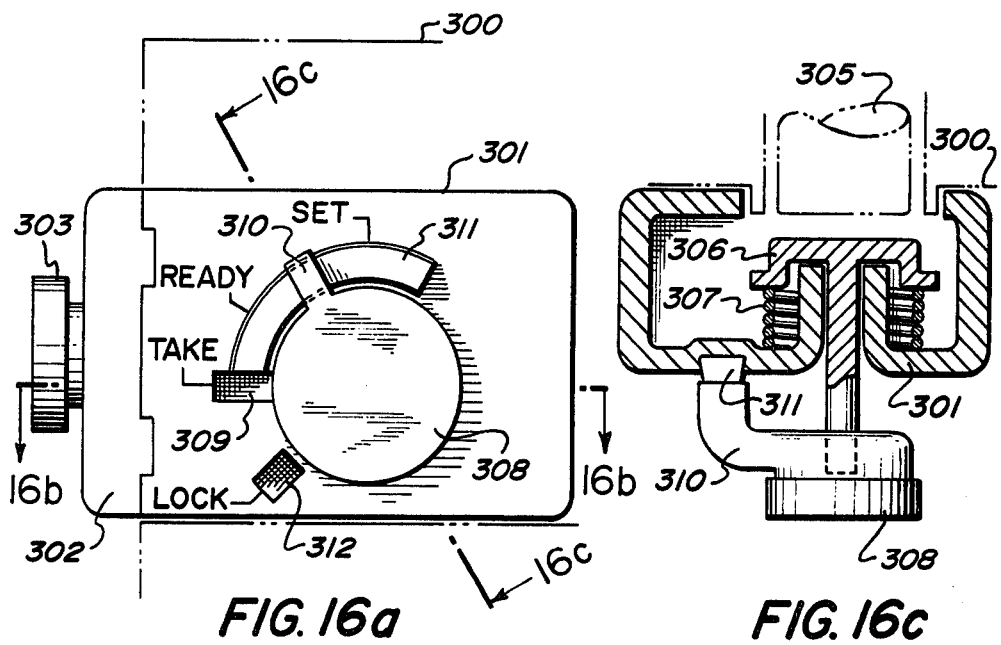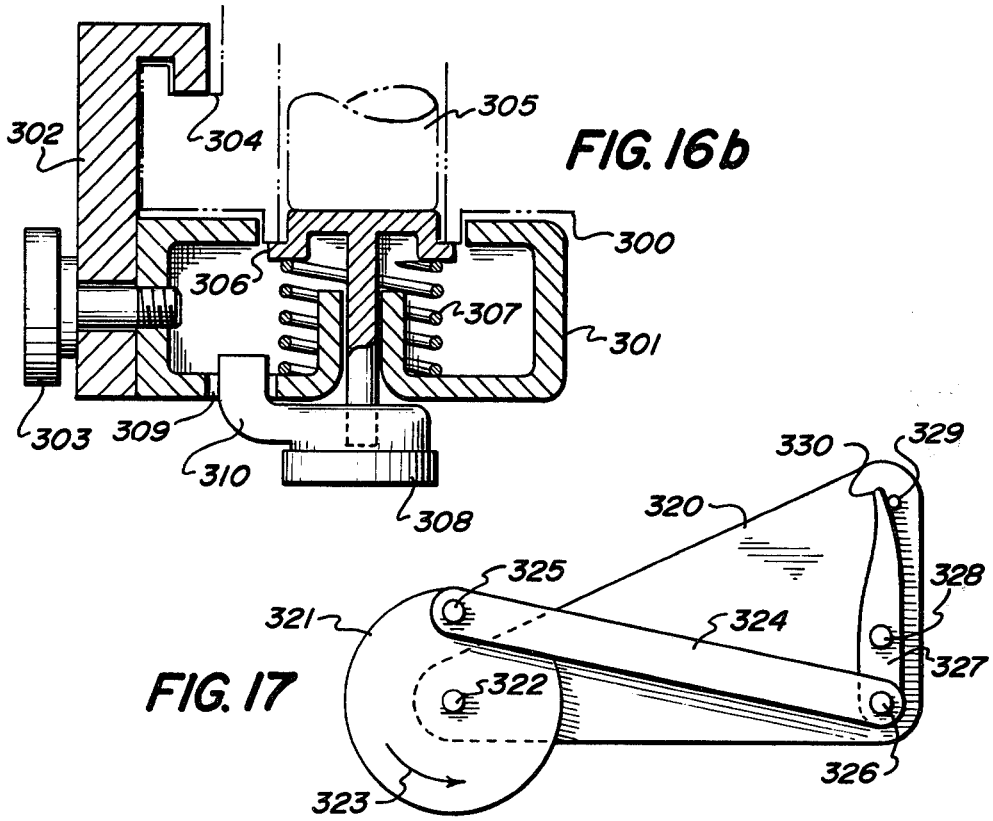

TIMED-ACTION ACTUATORS

BACKGROUND OF THE INVENTION

1. Field of the Invention

The present invention relates to timing devices which perform a mechanical response after a specified time interval after actuation.

2. Description of the Prior Art

Timing devices conventionally employ electrical or spring-powered clock motors, thermal displacement devices which release a spring, restricted fluid flow into a suction cup to release a spring, restricted fluid flow from a piston-cylinder assembly, chemical reaction rates or electronic timing.

U.S. Pat. Nos. 1,883,249 and 2,571,170 are illustrative of snap-spring devices used as a thermostat to actuate a device such as a switch.

U.S. Pat. No. 1,962,927 discloses use of a snap-spring device in a toy. The device of this patent operates because of differential expansion of the parts, e.g. thermostatically.

U.S. Pat. No. 1,988,345 discloses a pressure or temperature actuated snap-spring device.

U.S. Pat. No. 2,368,193 discloses a snap-spring device which is externally actuated.

U.S. Pat. No. 2,604,316 discloses a snap-disc spring device suitable for use in a circuit breaker.

Lastly, U.S. Pat. No. 2,545,264 discloses a displacement acting device to convert one character of movement into another that can produce either a fast snap movement or a slow creeping movement.

SUMMARY OF THE INVENTION

The present invention pertains to a resettable apparatus including a deformable restraining element adapted to contact and restrain active elements for producing a time-delayed force and/or displacement response. A device according to the invention functions by the release of the force and/or displacement active element by the creep deformation action of the restraining element at a time interval after actuation of the active element.

Devices according to the present invention provide force and/or mechanical, linear, or angular displacement application powered by a sustained, but not necessarily constant, force load mechanism which is released to perform a force and/or displacement response by the time dependent creep deformation of a restraining mechanism. The force load mechanism may be a deformed elastic spring of wood, metal, ceramic, glass, plastic, or elastomer; compressed fluid; weight; sustained acceleration of a mass; electromotive force devices; a magnetic field force device; or a buoyant force. The restraining, creep deformed mechanism is a mechanical member made at least in part of a viscoelastic polymer (natural or synthetic) or a metal which will creep at temperature of operation. The two elements; namely, a force producing active element and a viscoelastic restraining member, may be combined in a large variety of configurations.

BRIEF DESCRIPTION OF THE DRAWING

FIGS. 4a through 4b inclusive represents an alternate embodiment of the apparatus of FIG. 1.

FIGS. 5a through 5d inclusive is an alternate embodiment of the present invention.

FIG. 6 is an alternate embodiment of the actuator of FIG. 5.

FIG. 7 is an alternate embodiment of the restraining device of FIG. 5.

FIGS. 8a through 8b depicts a timed action actuator according to the present invention employing a lever.

FIGS. 9a through 9b inclusive depicts a timed action actuator according to the present invention employing a tensile member.

FIGS. 10a through 10c inclusive depicts a timed action actuator according to the present invention including a temperature compensation feature.

FIGS. 11a through 11b inclusive depicts an alternate embodiment of the apparatus of FIG. 10.

FIGS. 12a through 12b depicts an apparatus according to the present invention utilizes a straight beam.

FIGS. 13a through 13d inclusive discloses another embodiment of a timed action actuator according to the present invention.

FIG. 14 discloses a timed action actuator according to the present invention used in positioning nested tubular devices.

FIG. 15a through 15b discloses a door closing device utilizing the present invention.

FIGS. 16a through 16c inclusive depicts an unassisted time delay camera shutter operating button utilizing the present invention.

FIG. 17 discloses a multiple response timed actuator according to the present invention.

DESCRIPTION OF THE PREFERRED EMBODIMENT

Figure 1A:
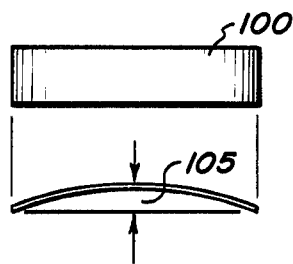
FIGS. 1a through 1e inclusive shows a fixed or stationary creep zone timed actuating device according to the present invention.
Figure 1B:
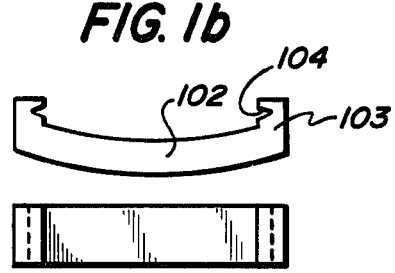

As set out above, the present invention pertains to a resettable device which provides force and/or mechanical, linear, or angular displacement response powered by a sustained, but not necessarily constant, force load mechanism which is released to perform a force and/or displacement response by the time dependent creep deformation of a restraining mechanism. The force load mechanism (force producing active element) may be a stressed elastic spring of wood; metal; ceramic; glass; plastic; or elastomer; a compressed fluid; a weight; a sustained acceleration of a mass; an electromotive force device; a magnetic field force device; or a buoyant force. The restraining (element) creep deformed mechanism is a mechanical member made at least in part of a viscoelastic polymer (natural or synthetic) or a metal which will creep at the temperature of operation. The two elements; namely, a force producing active element and a viscoelastic restraining element can be divided into two basic categories; namely, devices that respond by a change in configuration with and without escapement, herein referred to as Class I and Class II devices respectively.

Devices according to the present invention are resettable by: (a) self-restoring of the creep member to its undeformed (unloaded) configuration by internal stress such as in the case of polymers; (b) applying a sustained external load for reverse deformation creep; or (c) applying a mechanical operation to deform the creep element to its undeformed (unloaded) configuration. Devices according to the present invention may be adjusted in their response time, e.g. the time between actuation and response, by component design to give a fixed response time or a capability for altering geometry by mechanical means provided in the construction.

Turning now to the drawing, FIGS. 1a through 1e inclusive shows details of a fixed or stationary creep zone timed action response device with a viscoelastic member in the form of a thermoplastic beam. The device consists of a steel spring 100, 0.375 inches (0.953 cm) wide by 1.625 inches (4.128 cm) long by 0.010 inches (0.0254 cm) thick formed in an arc so that the cord distance shown as 105 in FIG. 1a was 0.125 inches (0.318 cm). A polypropylene viscoelastic member 102 (FIG. 1b) with end abutments 103 having notches 104 to accept spring 100 is assembled to achieve the configuration shown in FIG. 1c.

The polypropylene beam 102 is 1.438 inches (3.653 cm) long between the abutment and has a cross-sectional dimension of 0.156 inches (0.397 cm) high by 0.281 inches (0.714 cm) wide.

Figure 1C:
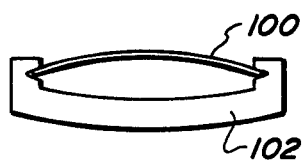
Figure 1D:
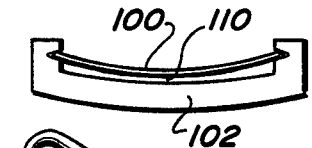
Figure 1E:
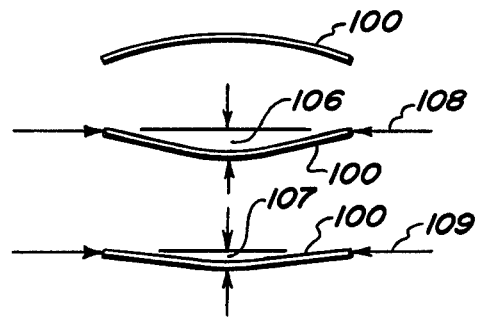

The notch 104 is approximately 0.188 inches (0.477 cm) from the beam's neutral axis. The spring 100 is distorted into a reversed curvature configuration as shown in FIG. 1d to activate the device. FIG. 1e shows a series of three depictions for the spring 100. First, the spring is shown relaxed with no end load. Next, the initial reversed curvature with cord height 106 and end force load 108 such that the spring is held in the reverse bend by the bending moment couple of force 108 times the cord height 106. In the actuation position (FIG. 1d), there is a gap 110 between the spring 100 and the beam 102. The spring end loads 108 (FIG. 1e) act correspondingly on the roots of the notches 104 in the beam ends 103 inducing a bending moment on beam 102 equal to a force 108 times the 0.188 inches (0.476 cm) between the notch and the neutral axis of beam 102. The viscoelastic beam 102 undergoes bending deformation slowly under the action of the bending moment and ends 103 are moved apart resulting in a decrease of cord height shown as 107 in FIG. 1e of the reversed bend in spring 100. In order to maintain a reverse bend bending moment in spring 100 with the reverse bend cord height 107 decreasing, the end load 109 must increase. These flow changes in configuration continue until instability sets in such that spring end load 109 becomes high enough to start elastically deforming beam 102 with sufficient deformation to significantly decrease cord height 107 and further increase load 109. This action rapidly reduces cord height 107 towards zero and spring 100 snaps back to its initial load-free configuration (FIG. 1c). The snap action force for the timed actuator described in relation to FIGS. 1a through 1e is such that when placed in an orientation where spring 100 is facing a hard surface in the actuation position (FIG. 1b), it will be propelled about 18 inches (45.72 cm) vertically from the surface about 10 seconds after setting when the ambient temperature is 90° F. (32.2° C.) and about 60 seconds when the ambient temperature is about 70° F. (21.1° C.).

Figure 2A:
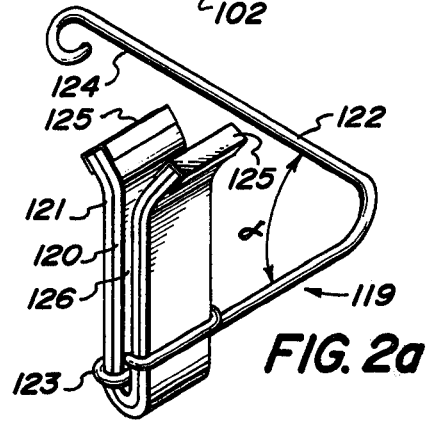
FIGS. 2a and 2c inclusive shows a moving creep zone timed actuator according to the present invention.
Figure 2B:
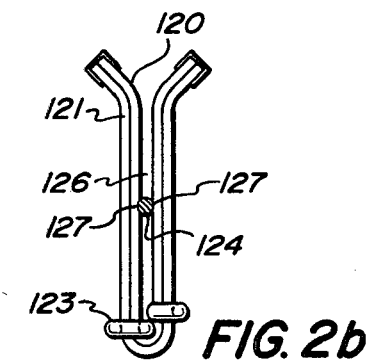
Figure 2C:
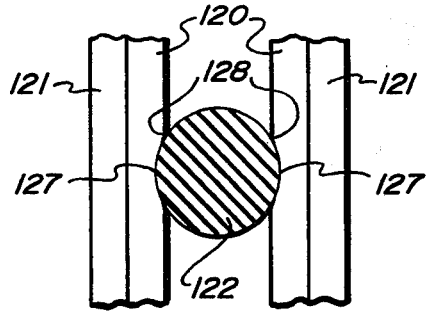

FIGS. 2a through 2c inclusive shows a moving creep zone timed-action response device with a viscoelastic member 120 in the form of an elastomer sheet confined by a metal clip 121. The device includes a 0.0313 inch (0.0794 cm) thick 0.4 inch (1.016 cm) wide Viton elastomer strip 120 inside of a 0.036 inch (0.0914 cm) thick, 0.4 inch (1.016 cm) wide beryllium copper spring clip 121 in an assembly resulting in a slot 126 (FIG. 2b) being formed and a force actuating spring 122 fabricated from a 0.045 inch (0.114 cm) diameter spring steel wire. The elastomer strip 120 is held in place in the clip 121 by the formed end 123 of the spring wire and adhesive tape 125. Dimensionally, the legs of the wire spring 122 are approximately 3 inches (7.62 cm) long and the length of slot 126 is approximately 1.2 inches (3.05 cm). To activate the device, the spring wire 122 is elastically deformed by bending to reduce the angle shown as alpha from 60° to 0° so that section 124 of spring wire 122 is forced down slot 126 to the position shown in FIG. 2b causing indentations 127 is elastomer strip 120 thus causing slot 126 to elastically open approximately 0.02 inches (0.0508 cm). Section 124 of wire 122 moves slowly toward the flared entrance of slot 126 with indentation 127 moving slowly along the elastomer strip 120 toward the flared end of spring clip 121 as shown in FIG. 2c. The pressure of the portion 124 of spring 122 on the elastomer in the vicinity of 128 (FIG. 2c) adjacent to indentation 127 causes it to yield in viscoelastic creep and allows indentation 127 to move along the elastomer strip 120 allowing spring wire 122 to move. When spring wire 122 reaches the flared opening of slot 126, it is released to snap back to the position shown in FIG. 2a, thus actuating the device. A timed-action response device according to this design has an actuation to response time which is relatively insensitive to the time span between successive actuation called recovery time period and to operating temperature changes.

FIGS. 1 and 2 disclose two basic embodiments of the present invention. Their detailed configuration may be modified so that they may be incorporated into action toys, surprise action games, delay action switches, process timers and many other useful devices. Devices according to the present invention involve many design and construction variations and various operational design features. In order to illustrate the scope of the invention, factors common to all time-action response devices will be listed in four categories. These categories are:

I. Functional factors of the device.
II. Method factors by which the timed-action response device functions are achieved.
III. Construction factors of the device which provide the means to implement the method factors.
IV. Design factors used to specify the combination of construction factors so that they provide the method factors to give the desired function factors, Functional factors of the device include an action response of force and/or displacement, time-delay between actuations and response and repeatable operation.

Method factors by which the timed-action response device functions are achieved include creep deformation; time-dependent strain in a viscoelastic element performing the timing function; and release of a force and/or displacement producing element by the time-dependent distortion of the viscoelastic element; and restoration of the viscoelastic element to its actuation configuration to allow repeatability.

Construction factors of the device include viscoelastic members to undergo creep deformation, and force producing members or mechanisms to cause creep deformation of the viscoelastic element and action response of force and/or displacement.

Figure 3:
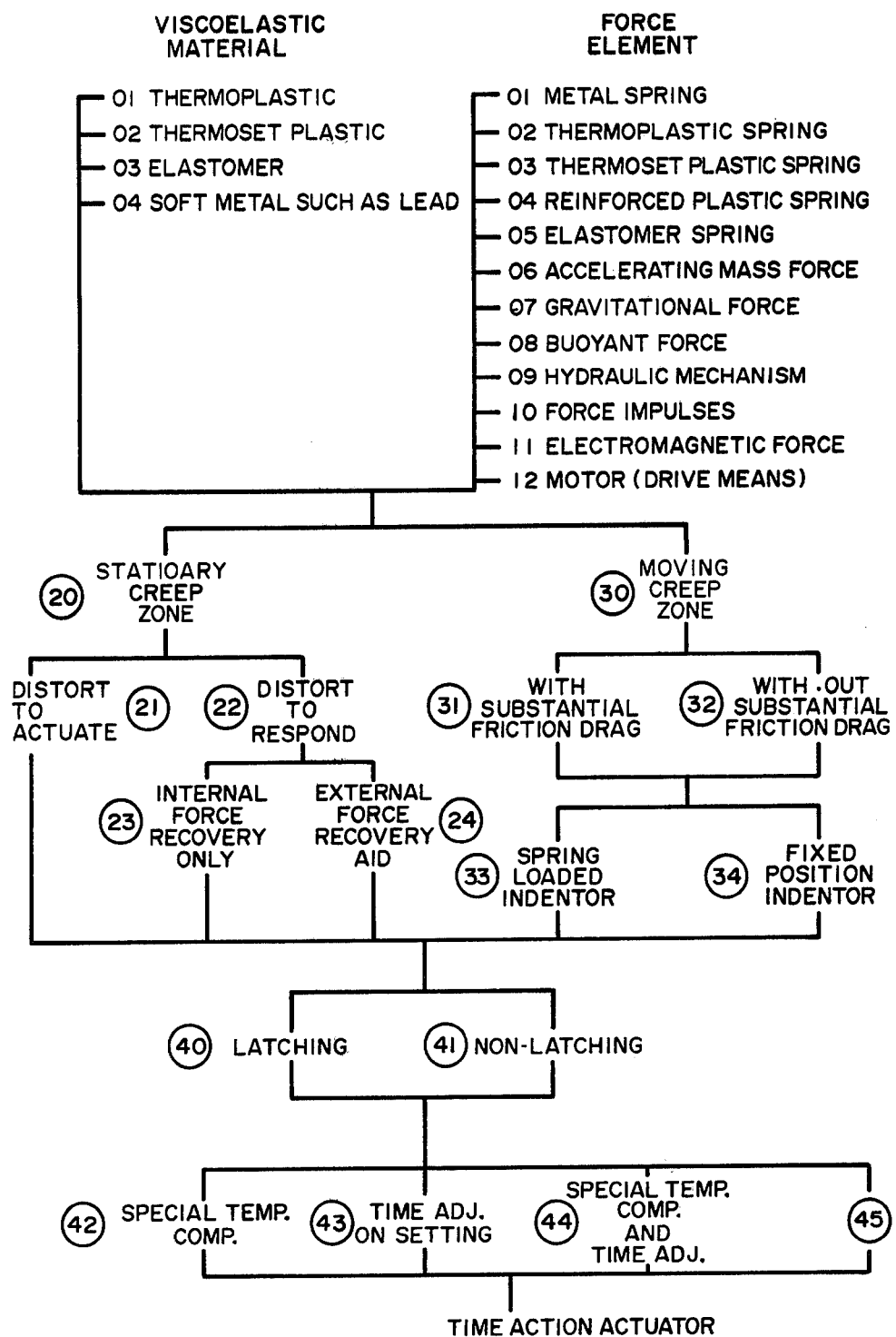
FIG. 3 is a chart of design factors utilized to construct devices according to the present invention.

In order to illustrate a significant number, but not all of the design factors and the combinations in which they can be utilized, a chart such as shown in FIG. 3 can be drawn or compiled. A specified timed-action actuator can be specified by a sequence of numbers corresponding to the numbers on the chart of FIG. 3. For example, one starts by specifying the viscoelastic element material and the force element and then proceeds down the chart following a single path to the bottom of the chart. As the chart is traversed, the numbers are recorded in sequence which correspond to each design feature to characterize the final timed-action actuator. For example, utilizing FIG. 3 for the apparatus of FIG. 1, it would be designated as a 01-01-20-22-23-41-45 design; 01 specifies the viscoelastic beam is a thermoplastic material such as polypropylene. Numeral 01 designates the force element as a spring steel strip. Numeral 20 designates the creep zone remains fixed or stationary throughout the viscoelastic beam, while numeral 22 designates movement is distorted away from its preset configuration by creep in order to eventually trigger the response snap-action of the spring. Numeral 23 shows that after response, the internal residual stress is within the creep distorted viscoelastic element causes it to creep back to recover its original preset configuration. Numeral 41 shows the snap-action response resulted from a rapid change in configuration of the spring steel strip but no mechanical latch was released, i.e. no escapement, Class I. Lastly, numeral 45 designates there were no special features added to the device.

The device of FIG. 2 will be designated as 03-01-30-31-33-40-44. Numeral 03 shows the viscoelastic element is an elastomer strip while numeral 01 shows the force element is a metal spring wire. The numeral 30 designates the creep zone moved along the elastomer strip as the indenting spring wire moved against it resulting in a moving creep zone. Numeral 31 shows no rollers or special lubricant or other design features lowered the friction between the moving wire and the elastomer strip so substantial frictional drag was present. Numeral 33 designates the metal spring clip surrounding the elastomer strip added spring loading of the contact between the indenting wire and the elastomer strip. The design feature reducing temperature sensitivity at low temperature. Numeral 40 indicates the snap-action response resulting from the spring wire being released in unlatching operation, i.e. escapement, Class II. Lastly, numeral 44 indicates the spring loading feature of the metal clip has a temperature compensating effect by causing the indentation depth of the spring wire into the elastomer strip to change in such a way with temperature so as to offset the corresponding changes of creep rate with changes in temperature. For the FIG. 2 device, time adjustment may be accomplished by how far the wire is pushed into the elastomer lined slot.

FIGS. 4a and 4b shows a device similar to the apparatus of FIG. 1 with an identical spring 130 and beam 131 is made of polyethylene with a beam cross-section of 0.25 inches (0.635 cm) wide by 0.25 inches (0.635 cm) high. Again, the notch is positioned 0.188 inches (0.476 cm) from the neutral beam axis, but the greater beam height and straight across design provides for an interference between the beam 131, spring 130, preventing the full reverse bend of the spring 130. The force diagram (FIG. 4b) is altered as shown. The interference provides a force load shown by arrow 133 and limits cord height 134, thus increasing the initial end loads 132 without interference between the spring 130 and the beam 131. Thus, the reaction time is shortened with a device according to FIG. 4 having a response time of about five seconds at 90° F. (32.2° C.) and 30 seconds at 70° F. (21.1° C.).

The influence of most of the materials and dimensional changes on the time-action response devices may be considered to be obvious to one skilled in the snap-spring art and engineering after reading the foregoing descriptions. However, for convenience, it must be pointed out that there is a limit in spring thickness in order that it can undergo the dimensional changes required elastically. If more spring force is desired without changing all dimensions, one or more springs would have to be used in a laminated configuration rather than increasing the thickness of the spring. FIGS. 5a through 5c inclusive show a Class I device designated as a disc configuration because the viscoelastic member 138 is in the form of a disc. The actuator comprises two sheet steel cruciform springs 135 and 137 each 0.005 inches (0.0127 cm) thick riveted together by a rivet 136 as shown in FIGS. 5a and 5b. The spring legs measure 0.98 inches (2.489 cm) across prior to bending a cord the height of 0.08 inches (0.203 cm) and the average length is 0.250 inches (0.635 cm). The viscoelastic member 138 shown in FIGS. 5c and 5d is polypropylene the consists of a 0.094 inch (0.2388 cm) thick disc 141 measuring 0.750 inches (1.905 cm) in diameter before it blends into rim 140 which is 1 inch (2.54 cm) outside diameter by 0.875 inches (2.22 cm) inside diameter by 0.220 inches high. A groove 139, 0.05 inches (0.127 cm) from the open end of rim 140 is 0.0313 inches (0.0795 cm) deep. The spring assembly 135, 137, 136 is snapped into the groove 139 to provide the assembly shown in FIG. 5e. The device of FIG. 5 is actuated by pressing the spring into reverse bends as shown by the dashed lines in FIG. 5e. The spring leg end load acting with the reverse cord height forms a bending movement which holds the spring in the reverse bend position (FIG. 5e). Both act to increase the diameter of the base of the notch 139 at the points of load application by creep deformation of the viscoelastic disc 138. The action is analogous to that described with the beam configuration of FIG. 1 and in a time interval the spring snaps back to original form. For the design of FIG. 5, the response time is about 15 minutes at 70° F. (21.1° C.) and 5 minutes at 85° F. (29.4° C.). When placed spring down on a hard surface, a device according to the FIG. 5 will jump about two feet (61.0 cm) when the spring resumes its original position. Double springs were used in the device of FIG. 5 to increase the spring force within the constraints of the overall size of the device. The response time of the device of FIG. 5 can be changed by varying the materials of construction and their dimensions. For example, polyethylene can be substituted for polypropylene for manufacture of the disc 138 and the response time changed to 30 seconds at 70° F. (21.1° C.) and 10 seconds at 85° F. (29.4° C.). Substituting a nylon disc would increase the response time. Increasing the rim thickness, outside diameter minus inside diameter, will increase the response time. The increase in rim length will allow a greater reverse bend before interference also increasing the response time. Large increases in rim height increases the response time by making the rim more flexible. Thus, by judiciously selecting the materials and dimensions, response times can vary from 1 second to a matter of hours.

FIG. 6 shows a variation of the spring for the time-action actuator of FIG. 5. The spring is fabricated from two crossed strips 142, 143 instead of a cruciform spring. Crossed strips are secured by a rivet 144 so that there is clearance to allow the full length of the spring strip to assume a curved configuration.

FIG. 7 shows a viscoelastic body 145 with double rims accepting two actuating spring assemblies such as shown in FIG. 6. While various operating modes can be used with the apparatus of FIG. 7, it is intended that only one side be activated at a time. Thus, the activated spring will by the geometry of the viscoelastic body 145, stretch open the diameter of its associated rim and tend to close the diameter of the opposing rim if it were distorted by prior action and restore its response time interval.

FIG. 8 shows a Class I, lever designed timed-action response device consisting of a force producing spring 152 and a viscoelastic body 151. The solid-line drawing shows operating lever 150 in the open position (unstressed position). The dashed position of lever 150 shows it in the second position with strip spring 152 bowed and its end force is acting on the bottoms of the notches in parts 150, 151 respectively, such that the line of action of the force acting at the point 154 is just below the line shown through the notch in 151 and the center of pin 153. Thus, the small moment is holding lever 150 closed. However, the force load on pin 153 applies a bending moment to the viscoelastic body 151 distorting it until the center pin 153 is below the line of action of the spring 152 end force applied at 154. Now the spring 152 force acting at 154 provides a slight movement acting to swing open lever 150 causing it to start opening. As lever 150 opens, the opening movement increases and lever 150 snaps to the open position to perform its designated function. Viscoelastic body 151 can be fabricated from plastic or metals such as lead.

FIGS. 9a and 9b show schematically a Class I device with a viscoelastic tensile member combined with a two bar linkage, 160 and 161 pinned by pin 162 and designated by numerals 01-07-20-23-41-45 (FIG. 3). Bar 160 is anchored, pins 164 and 165 in bars 160 and 161 respectively provide for the attachment of viscoelastic filament loop 163 and nylon mono-filament fishing line being one example of such filament. The location of pins 162, 164, and 165 coupled with the length of bars 160, 161 and viscoelastic loop 163 are such that when weight force 166 is applied as shown, the viscoelastic loop 163 stretches elastically but does not allow bars 161 to swing down under the action of the weight force by providing counter-movement around pin 162. However, the viscoelastic loop slowly stretches in a creep action allowing bar 161 to rotate down slowly. The lever arm of the tension force in member 163 acting at pin 165 decreases causing an increase in tension with additional elastic stretch and increasing creep rate. This action increases until loop 163 is stretched enough elastically and in creep to allow lever 161 to swing down under the load of weight force 166 and perform a useful function. If the viscoelastic element 163 was an elastomer which would contract with an increase in temperature, the device would be temperature compensating.

FIGS. 10a through 10c illustrates a Class I beam-type timed-action response device which incorporates with other design features, a temperature compensating feature by having a spring 170 attached to ends 172 by pins 173. Thus, differential expansion between the spring 170 and viscoelastic beam 171 would cause a configuration change shown in FIG. 10b for the relatively warm temperature case such that $h_1$ is a large value due to the increased bowing of beam 171 resulting from its thermal expansion greater than that of spring 170 without interference from adjustable stop 169. Thus, a greater reverse bend is allowed upon actuation of spring 170. Also, end notches which would be expanded away from the spring ends of a FIG. 1 design cannot do so because of the pin joint shown in FIG. 10a. Lower temperatures would cause a relative shortening of the viscoelastic member 171 resulting in less bending beam 171 and a smaller height $h_2$, such as shown in FIG. 10c. The smaller reverse bend (FIG. 10c) would tend to shorten the response time in accord with the discussion of FIG. 4 above and compensate for the higher modulus and lower creep rate associated with the lower temperature which would lengthen response time.

FIG. 11a shows another temperature compensation device similar to that of FIG. 10 by varying the construction so that the differential expansion acts to change the geometry to increase the response time with increasing temperature to compensate for the decrease in the elastic modulus and increase in creep rate in the viscoelastic element. By dividing viscoelastic member 177 into two halves and reversing them in orientation and attaching them to the rigid metal strip 178 by fasteners 179, the increase in temperature will decrease the distance between the notches accepting spring 176. This dimensional change will cause a greater reverse bend in the spring 176 lowering the initial end force and increasing the required creep displacement before actuation.

FIG. 11b shows in elevated and plane views another temperature compensation device similar to that of FIG. 11a by again varying the construction so that the differential expansion acts to change the geometry to increase the response time with increasing temperature to compensate for the decrease in elastic modulus and increase in creep rate in the viscoelastic element. By pinning the viscoelastic element 191 at locations 193 to a rigid, low thermal expansion member 194, differential thermal expansion of element 191 causes the abutments 192 to pivot about pins 193 and to be rotated so as to bring notches 195 closer together. This dimensional change will cause a greater reverse bend in spring 190 lowering the initial end force and increasing the required creep displacement before actuation.

FIG. 12 shows a Class II straight beam configuration timed-action response device so-called because of the straight viscoelastic beam member 210 with latch spur 211 on one end and spring support 212 on the other end and it is designated by numerals 01-01-20-22-23-41-45 (FIG. 3). The actuator spring assembly is comprised of a spring 216 supported by pin 214 with catch 213 on one end and a nut 215 on the other end. Spring 216 is captured between catch 213 and washer 217. In FIG. 12a, the catch 213 is a bearing on spur 211 with spring 216 compressed. The compressed force provides a bending movement on viscoelastic beam 210 which will at first elastically and then in creep cause beam 210 to bend and eventually cause a release of catch 213 from the spur 211. The released configuration is shown in FIG. 12b.

The Class II timed-action response device of FIG. 13a is a disc-type whereby the viscoelastic member 240 is a slotted disc form attached to rod 245 by screw 246 and with design numerals 01-01-20-22-24-41-45 (FIG. 3). On rod 245, a hub 244 which is acted upon by spring 243, compressed between hub 244 and housing 242 pulling disc 240 against restriction opening 241 is assembled. Shown in detail in FIG. 13c are the spokes of disc 240 bending under the spring load and after creep deformation (dashed outline) being on the verge of slipping through the restriction 241, thus allowing rod 245 to snap to the right. Hub 244 will come to rest against the housing closure 249 (FIG. 13a) to activate the device, rod 245 is pushed to the left forcing disc 240 back through opening 241 as shown in FIG. 13b. The spokes of viscoelastic disc 240 are bent in a reverse direction which restores or resets the spokes to their original configuration if the device is actuated repeatedly not allowing time for them to creep back under internal stress. The beveled end shown in FIG. 14d enhances the degree of the reverse bend for opening.

FIG. 14 shows a Class I beam-type timed-action response device used as an assembly aid for telescoping tube attachments such as found in construction of beach umbrellas and the like. Instead of having to hold the locking pin 271 flush while tube 270 is slipped into another tube or removed from it, pin 271 is attached to a timed-action actuator spring 272 so that it may be momentarily snapped back flush and allow the assembler to use both hands to nest the tubes. Viscoelastic member 273, which is attached to tube 270 with rivet 274, will creep deform enough in a few seconds to snap the locking pin 271 outwardly of tube 270 to engage a suitable opening in the other tube (not shown) as is well known in this art.

FIG. 15a and 15b illustrate modifications to a conventional screen-storm door closure such that an extra push after the door is fully opened in the normal manner would open it slightly more and activate a disc time-action actuator to hold the door open for a short period of time. One of the many possible arrangements for this apparatus would be to retain the viscoelastic member 342 in the end of the piston housing 340 by crimping it in place, designated as 01-01-02-22-24-41-45 (FIG. 3). Piston rod 341 would have a contoured abutment 343 such that it may be pulled through the slotted disc portion of viscoelastic member 342 activating the device upon extra opening. In the prescribed time, the abutment 343 will push back through disc 342 which deforms in creep, thus allowing the door closure to resume normal operations.

FIG. 16 shows a Class II moving creep zone timed-action response device with a design chart number of 03-01-30-32-33-40-44 which is used as an unassisted, time delay shutter button operator for a quick developing camera such as sold under the trademark Polaroid as a model PRONTO! B. The timed-action response device housing 301 is secured to the camera body 300 by bracket arm 302 which is hooked into the print number indicator window 304 and secured to housing 301 by screw 303. The timed-action device consists of plunger 306 screwed to knob 308 and attached to spring 307. Spring 307 provides both a translation force acting to push the plunger 306 toward shutter button 305 and a rotational torque acting to rotate the plunger in a counterclockwise direction. When the device is not activated, indentor 310 is attached to knob 308 and rests on the "lock" position abutment 312 and plunger 306 is held in a retracted position relative to shutter button 305. Actuating the device consists of pulling knob 308 out and rotating it clockwise until the indentor 310 reaches the "set" position indicated on housing 301. At this position, the interior is pressed into elastomer strip 311 and then the knob 308 is released. The indentor 310 will move slowly along elastomer strip 311 allowing knob 308 to rotate slowly in the counterclockwise direction. The camera subjects are positioned by the time the indentor 310 reaches the "ready" location. The indentor 310 continues to travel until it reaches and enters opening 309 which allows plunger 306 to push shutter button 305 and take the picture. Actuation position of the indentor may be varied for time delay adjustment and the ratio of translation to torque force constants of the spring are varied to achieve temperature compensation.

FIG. 17 shows a multiple response timed actuator according to the present invention. Motor (spring, electric, etc.), not shown, is connected to wheel 321 which rotates on pin 322 which is supported by a bearing in frame 320. Connecting rod 324 pivots on pin 325 affixed to wheel 321 and pin 326 affixed to viscoelastic beam 327 which rotates on pin 328, which is fixed to frame 320. The motion of tip 330 of beam 327 is interfered with by pin 329 attached to frame 320. Beam 327 is impeded from moving until it bends in creep deformation and tip 330 slips past pin 329. Beam 327 moves until tip 330 again engages pin 329 which delays its motion until it again deforms in creep and slips past pin 329. A device according to FIG. 17 is identified from FIG. 3 as an 01-12-20-22-24-40-45 design.

From the foregoing description, it is apparent that a variety of force and/or displacement actuators and restraining creep deformation member materials can be used. Even by restricting the design system to one combination of elements, there area a wide variety of designs possible. However, reviewing one such design system in detail provides the demonstration of design principles and technical guidance to one skilled in the to allow him to design a myriad of timed-action response devices.

It is within the scope of the invention that there are combinations of more than one timed-action device into an integrated design. For example, one can use a moving creep zone and stationary creep zone in parallel or series to achieve a special effect, for example, temperature compensation or two-stage response. Temperature compensation is intended to include making the response time a function of temperature as well as essentially insensitive to temperature changes. Also, the timed action response device components may be multifunctional, as in the case of the viscoelastic member may be an integral part of a molded thermoplastic toy. In another design, a single strip of elastomer may function as both the force element and viscoelastic element.

Having thus described my invention, what is desired to be secured by letters patent of the United States is set forth in the appended claims.

I claim:

1. A resettable apparatus for producing time delayed force and/or displacement response comprising in combination:

a first or restraining element, said first element being constructed of a material that will, under load, exhibit creep deformation within its intended operating temperature range; and a second or force producing element disposed proximate said first element so that said second element can be moved into contact with said first element to engage said first element and produce elastic distortion of said first element;

whereby when said second element is moved into an actuation position the elastically distorted portion of said first element creeps such as to increase the distortion under load to, after a time delay, release or permit said second element to return to its original or released position.

2. An apparatus according to claim 1 wherein said first element exhibits elastic and then viscoelastic properties under deformation loading.

3. An apparatus according to claim 1 wherein said first and second elements are arranged to produce a stationary creep zone in said first element in said actuation position.

4. An apparatus according to claim 1 wherein said first and second elements are arranged to produce a moving creep zone in said first element in said actuation position.

5. An apparatus according to claim 1 including means to latch said second element to said first element.

6. An apparatus according to claim 1 including means to compensate for mechanical property changes with changes in operating temperature so that said apparatus operates at an essentially constant time of response independent of temperature.

7. An apparatus according to claim 1 including means to adjust the time of response of the apparatus.

8. An apparatus according to claim 1 wherein said first element is constructed of a material selected from the group consisting essentially of natural or synthetic thermoplastic, thermoset plastic, elastomeric or low-strength metallic material.

9. An apparatus according to claim 1 wherein said second or force producing element is selected from the group consisting essentially of metallic spring material, thermoplastic spring material, thermoset plastic spring material, reinforced plastic spring material, elastomeric spring material, accelerating mass force, gravity force, hydraulic mechanisms, force impulse mechanisms, electromagnetic force mechanisms and combinations thereof.

10. An apparatus for producing time delayed force and/or displacement response comprising in combination:
 a first or restraining element, said first element being constructed of a viscoelastic material exhibiting a definable creep rate under deformation loading at its intended operating temperature; and
 a second or force element disposed proximate said first element so that said second element can be moved into an operating position to contact and deform said first element under a load;
 wherein said deformation loading of said first element initiates creep deformation of that portion of said first element in contact with said second element to after a time delay release said second element to act.

11. An apparatus according to claim 10 including means to have the time or response vary with its temperature in a specific way.

12. An apparatus according to claim 10 wherein at least one combination having a stationary creep zone to produce a time delayed response is combined with at least one combination of a moving creep zone to produce a time delayed response is assembled to co-act to produce a time delayed response.

13. An apparatus according to claim 10 wherein the combination is selected to produce a multiplicity of time delayed responses.

14. An apparatus according to claim 10 which upon actuation provides a series of timed responses.

15. An apparatus according to claim 10 including means to aid the viscoelastic element to return to its preactuation configuration.

* * * * *